June 17, 1947. F. J. YOUNG 2,422,383
ROTARY MACHINE
Filed April 11, 1938 2 Sheets-Sheet 1

Inventor
Forrest J. Young
By Lyon & Lyon
Attorneys

June 17, 1947.　　　　F. J. YOUNG　　　　2,422,383
ROTARY MACHINE
Filed April 11, 1938　　　2 Sheets-Sheet 2

Inventor
Forrest J. Young
By Lyon & Lyon
Attorneys

Patented June 17, 1947

2,422,383

UNITED STATES PATENT OFFICE 2,422,383

ROTARY MACHINE

Forrest J. Young, Los Angeles, Calif., assignor to The National Supply Company, Pittsburgh, Pa., a corporation of Pennsylvania Application April 11, 1938, Serial No. 201,349

10 Claims. (Cl. 255—23)

This invention relates to rotary machines as used in the drilling of water, gas, oil, or other wells, and is more particularly related to the driving connection provided between the rotary table and the drill stem for the transmission of the torque from the table to the drill stem.

It is an object of this invention to provide a rotary machine in which there is provided a driving connection between the rotary table and the drill stem for the transmission of the torque from the table to rotate the drill stem wherein the driving connection acts as a single integral unit.

Another object of this invention is to provide a driving connection for the transmission of torque from the table of a rotary machine directly to the drill stem.

Another object of this invention is to provide a drive bushing for a rotary machine, which bushing is driven directly from the rotary table, and operates in conjunction with the master bushing in the table without disturbing its position or mounting.

Another object of this invention is to provide a rotary machine in which the driving connection for transmission of the torque from the table to the drill stem includes a drive bushing which overlaps the master or table bushing in telescopic relation.

Another object of this invention is to provide a rotary machine including a driving connection for the transmission of the torque from the rotary table to the drill stem wherein the master bushing is positioned within the rotary table below the top thereof in such relation to the surface of the rotary table as to permit the slips for supporting the drill pipe to be moved from the table top into position in the tapered bore of the master bushing, without meeting the upper outer edge of the master bushing as an obstruction.

Another object of this invention is to provide a rotary machine drive bushing for transmitting the torque from a rotary table to a drill stem, which drive bushing is adapted to be positioned upon the kelly and which drive bushing is provided with a pilot means at its lower end for lining up the drive bushing with the rotary table preparatory to the lowering of the same into position of driving engagement with the rotary table.

Another object of this invention is to provide a rotary machine drive bushing having pilot means on its lower end, which pilot means are relieved to avoid wear after the drive bushing has been positioned in driving engagement within the rotary machine.

Other objects and advantages of this invention it is believed will be apparent from the following detailed description of a preferred embodiment thereof as illustrated in the accompanying drawings.

Figure 1:
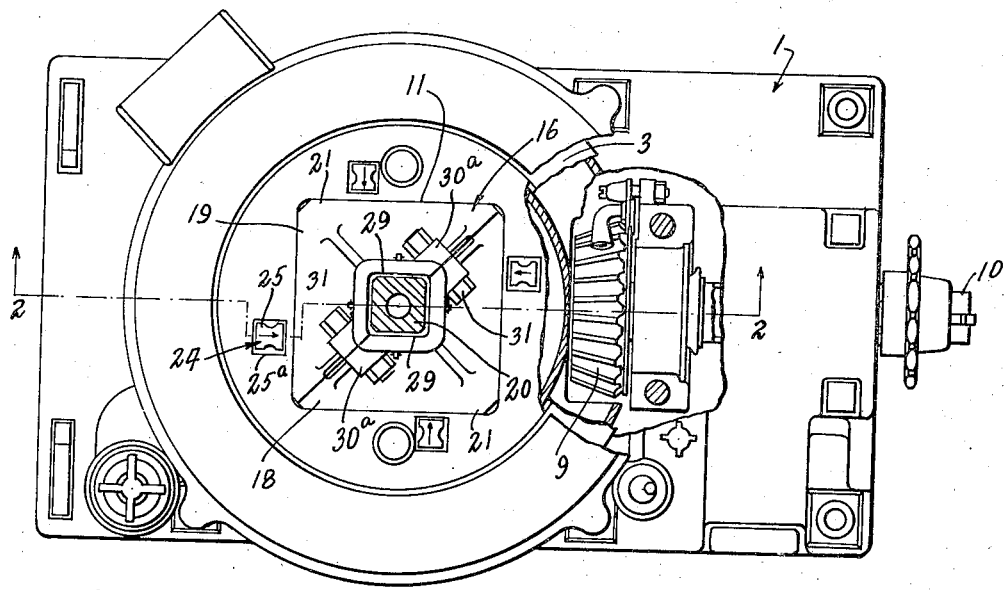
Figure 1 is a plan view of the rotary machine in which my invention is incorporated, in fragmental horizontal section.
Figure 2:
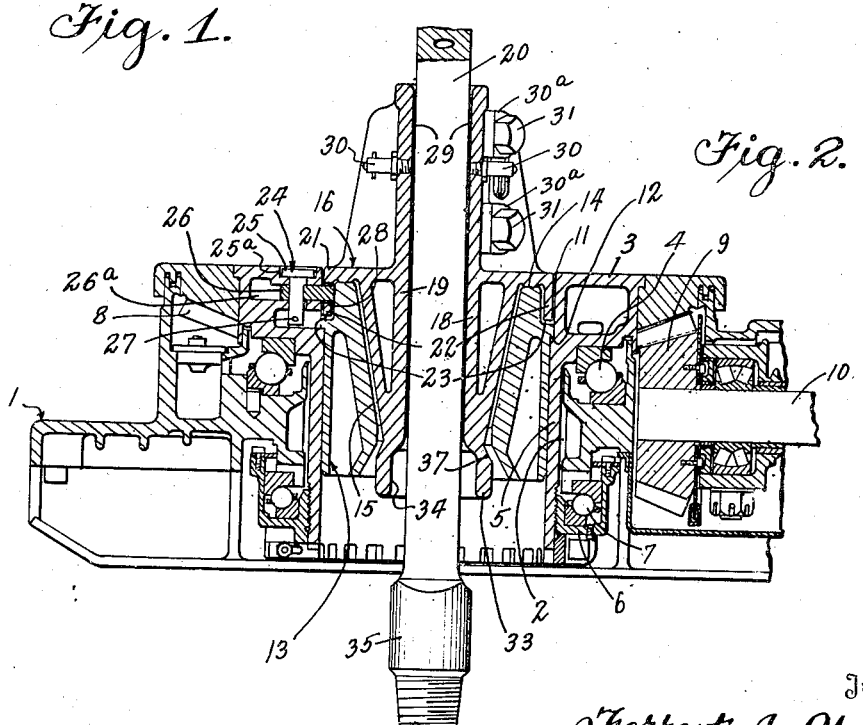
Figure 2 is a side elevation of the rotary machine as illustrated in Figure 1 on a slightly larger scale, which view is mainly in vertical mid-section.
Figure 4:
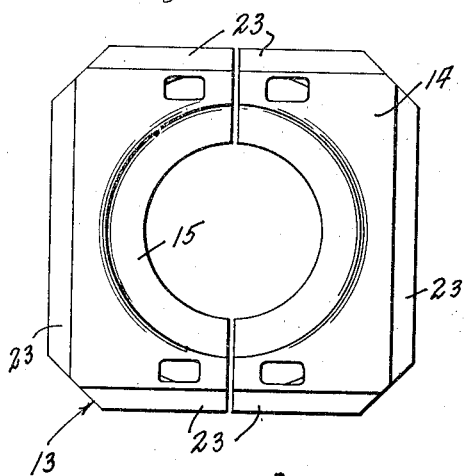
Figure 4 is a plan view of the master bushing.
Figure 3:
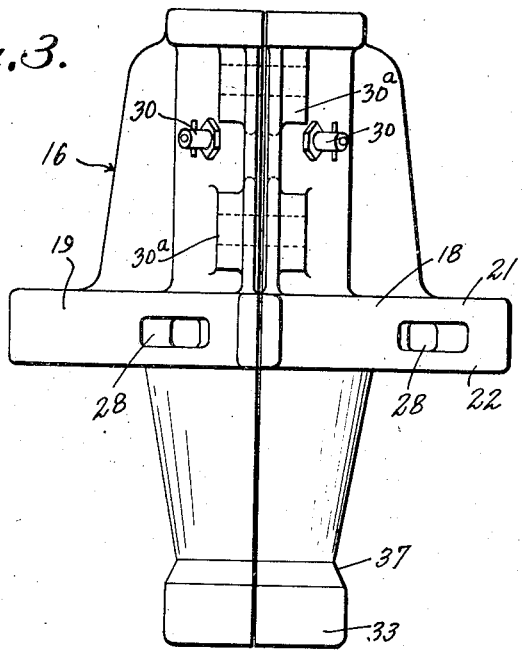
Figure 3 is a corner elevation of the drive bushing embodied in my invention.

In the preferred embodiment of my invention illustrated in the accompanying drawings, 1 indicates the base of the rotary machine, which base is formed with a central opening 2.

The rotary machine table 3 is rotatably supported upon the base 1 upon supporting bearings 4. The table 3 is provided with a downwardly extending cylindrical skirt 5 which projects through the opening 2 of the base 1. The table skirt 5 carries at its lower end a bearing ring 6 upon which an upthrust bearing 7 is mounted with relation to the base 1. The table 3 is provided with a gear ring 8 adapted to mesh with a pinion 9 carried by a pinion shaft 10.

While the particular rotary machine illustrated in the drawings is described, it will be obvious that my invention is not limited in its applicability to this particular construction or type of rotary machine. The table 3 is provided with a substantially square opening or recess 11 from its upper surface, which opening or recess terminates in a shoulder 12 above the cylindrical skirt 5. While the opening 11 is herein illustrated as being square, it is obvious that any multi-sided formation of opening may be employed as desired.

Mounted within the skirt 5 and the opening 11 so as to rest upon the shoulder 12 is a master bushing 13. This master bushing may be of any or desirable construction, but is so formed that its upper surface 14 terminates below the upper surface of the table 3. The master bushing 13 is formed above the shoulder 12 in the structure as herein illustrated with a square section so that it will be driven with the table 3. The master bushing is formed on its inner surface to provide a tapered seat 15 for the reception of the drive bushing 16 or pipe supporting slips 17, depending upon the operation being performed. The upper end of the master bushing 13 extends within the drive bushing 16 in order that the tapered seat 15 may be made as long as possible to provide a relatively long supporting surface for the back of the slips 17.

The drive bushing 16 is formed of two sections 18 and 19, which sections are of complementary formation as illustrated. The drive bushing 16 is so formed as to provide a single integral driving unit for the transmission of the torque directly from the rotary table 3 to the drill stem or kelly 20. In order to accomplish this result, the drive bushing is formed with a driving section 21 which corresponds in configuration with the opening 11 of the rotary table. The drive section 21 is provided with downwardly extending flange sections 22 which extend into recesses 23 formed by recessing the master bushing 13. These flange sections 22 fit within this recess between the master bushing 13 and the opening 11 of the rotary table 3.

In order to lock the assembly of the master bushing 13 and drive bushing 16 within the opening in the table 3, a lock means is provided which acts to lock the assembly of the master bushing 13 and drive bushing 16 in position, or may act to maintain the master bushing alone in position when the drive bushing is removed. This lock means includes a lock pin 24 which is carried by the table 3 and which has a non-circular portion 25 adapted to fit within a corresponding recess 25a in the top of the table 3.

Slidably but non-rotatably mounted relative to the pin 24 is a lock bar 26, which is positioned within a recess 26a formed in the table 3. To actuate the lock bar 26, the pin 24 is lifted to bring the cooperating non-circular portion 25 and recess 25a out of engagement, and then turned to the desired position and dropped back into the recess 25a. Any desirable means, such as a pin 27, may be passed through the lower end of the pin 24, to prevent its displacement.

Formed in the drive bushing 16 are lock recesses 28 into which the lock bars 26 are adapted to be projected upon rotation of the pin 24. The recess 26a is of such extent as to permit the lock bar 26 to be rotated out of locking engagement. As illustrated in Figure 1, any suitable or desirable number of such lock means may be provided, it being there illustrated that four such means may be provided.

It will be obvious that when the drive bushing 16 is removed that upon projection of the lock bar or bars 26 into the opening in the rotary table 3, that said lock bars may act to engage the lower surface of the recess 23 formed in the master bushing to prevent displacement of the master bushing.

The drive bushing 16 is provided with driving faces 29 for the kelly 20, which are relatively long and which extend above and below the position of the drive flanges 22. This construction provides a relatively large area of contact between the driving faces of the kelly 20, thereby reducing the unit pressure therebetween. The opening in the drive bushing 16 is formed to correspond with the exterior configuration of the kelly and while the same is herein illustrated as square, it will be obvious that if the kelly 20 is formed of different polygonal form, that the opening in the drive bushing may be shaped to correspond therewith.

In order to permit the kelly to move freely within the opening formed in the drive bushing 16, grease fittings 30 are fitted to the upward guide extension of the drive bushing so that grease under pressure may be forced into the opening or space between the kelly and the drive bushing, thus to aid in the longitudinal movement of the kelly 20 with relation to the drive bushing 16.

In order to form an integral drive bushing assembly, each of the sections 18 and 19 is formed with outwardly extending ears 30a through which bolts 31 may be passed to clamp the two sections 18 and 19 together to form an integral unit. When the kelly 20 is withdrawn from the rotary machine to either add or subtract sections of drill pipe, the drive bushing 16 will follow the kelly 20 in removal permitting the slips 17 to be inserted into the master bushing 13 to grip the drill pipe 32 during such operation.

In order to aid in the positioning of the drive or drill stem bushing 16 within the master bushing 13, the sections 18 and 19 are formed at their lower ends to provide a pilot 33 whereby they are guided into position. The pilot 33 is formed with an opening 34 to receive the enlarged portion 35 of the kelly as the kelly is withdrawn from the rotary machine so that the drive bushing 16 will properly follow the kelly in its withdrawal.

The pilot 33 formed on the lower end of the drive bushing 16 cooperates with the tapered portion 15 of the master bushing 13 to line up the drive bushing with the master bushing preparatory to the polygonal drive flange 22 dropping into its complementary opening 23 in the table 3. It will likewise be apparent that this formation of the drill stem bushing and the master bushing provides for a telescoping interengagement of these bushings whereby the assembly as thus formed is driven directly from the table 3.

The pilot 33 is relieved as indicated at 37 in order that the pilot 33 may move out of contact with the master bushing 13 upon completion of the driving engagement between the table 3 and the drive bushing 16.

Figure 5:
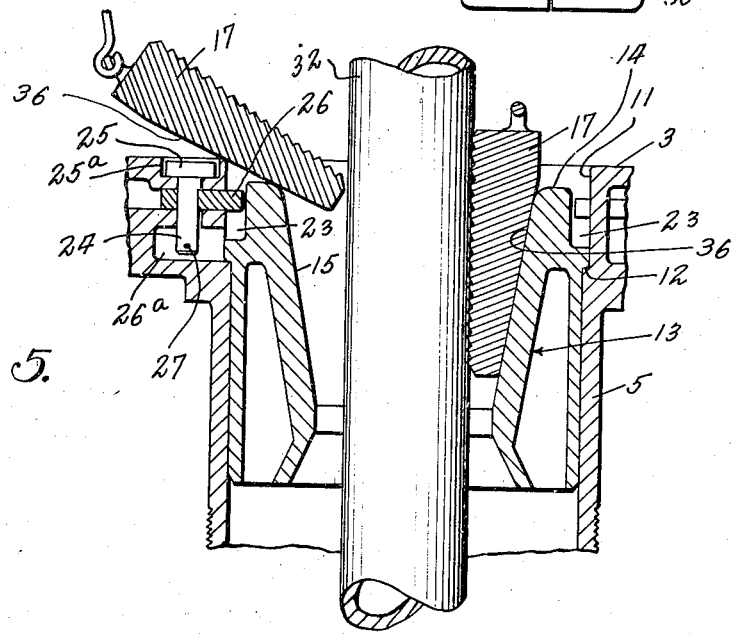
Figure 5 is a fragmental vertical section illustrating the relation of the master bushing to the table and the positioning of the supporting slips within the master bushing to support the drill pipe.

In order to prevent the slips 17 from "hanging up" when they are being moved into the rotary machine to grip the drill pipe 32, the upper surface of the master bushing 13 is located below the upper surface of the table 3 and is positioned in such a manner as is illustrated in Figure 5 so that when the back 36 of the slips 17 is rested upon the top of the rotary table and pushed forwardly toward the pipe 32, the slips 17 will not engage the upper edge of the master bushing 13 but will be guided into the tapered opening of the bushing 13 in position to grip the pipe 32.

This application is an improvement of the structures of rotary machine and rotary pump as disclosed in the co-pending applications of John S. Morgan, and John D. Spalding, Serial No. 128,468, filed March 1, 1937, for Rotary machine; A. O. A. Hodge, Serial No. 182,996, filed January 3, 1938, for Rotary pump; and John D. Spalding, Serial No. 189,054, filed February 7, 1938, for Rotary machine.

Having fully described my invention, it is to be understood that I do not wish to be limited to the details herein set forth, but my invention is of the full scope of the appended claims.

I claim:

1. In a device of the class described, including a rotary machine having a table rotatably mounted upon a base, the table having a central opening through which a drill stem may extend, the combination of a master bushing supported by said table in said opening, an integral drive bushing positioned centrally of the master bushing and adapted to form a slidable and non-rotatable connection with the drill stem, drive means for said drive bushing including a drive flange on said drive bushing having a depending rim of non-circular configuration at its outer edge, the flange overlapping the upper surface of the master bushing, and the rim extending substantially below the upper surface of said master bushing and engaging within a complementary non-circular recess in the table.

2. In a device of the class described, including a rotary machine having a table rotatably mounted upon a base, the table having a central opening through which a drill stem may extend, the combination of a master bushing supported by said table in said opening and provided with a tapered bore for slips, the upper surface of the master bushing lying below the upper surface of the table, an integral drive bushing positioned centrally of the master bushing and adapted to form a slidable and non-rotatable connection with the drill stem, drive means for said drive bushing including a drive flange on said drive bushing having a depending rim of non-circular configuration at its outer edge, the flange overlapping the upper surface of the master bushing and the rim extending substantially below the upper surface of said master bushing and engaging within a complementary non-circular recess in the table, the proportions of the recess and master bushing being such that, in the absence of the drive bushing, a slip may be moved from the upper surface of the table into position within the tapered bore without meeting the upper outer edge of the master bushing as an obstruction.

3. In a device of the class described, the combination of a rotary machine having a table rotatably mounted on a base, the table having a central opening through which the drill stem may extend, a master bushing supported by said table in said opening, a drive bushing carried by said master bushing and adapted to form a slidable and non-rotatable connection with the drill stem, the drive bushing having a flange overlapping the master bushing and adapted to be driven directly from the table, and cooperating means including a rim depending from the flange, and an upstanding wall on the master bushing adapted to place said bushings in telescopic relation.

4. In a device of the class described, the combination of a rotary machine having a table rotatably mounted upon a base, a master bushing supported centrally of said table and having an upstanding wall adapted to cooperate with the table to define a non-circular recess, a drive bushing carried centrally of said master bushing and adapted to drive a drill stem, the drive bushing having a drive flange overlapping the master bushing, a non-circular rim on said drive flange depending into said recess whereby the drive bushing may be driven directly from said table, the rim cooperating with the upstanding wall to place said bushings in telescopic relation.

5. In a device of the class described, the combination of a rotary machine having a table rotatably mounted upon a base, a master bushing supported centrally of said table and having an upstanding wall adapted to cooperate with the table to define a non-circular recess, the upper surface of the wall on said master bushing being disposed below the upper surface of the table, said master bushing being provided with a tapered bore for slips, a drive bushing carried centrally of the master bushing and adapted to drive a drill stem, a drive flange on said drive bushing having a depending rim adapted to be received within said non-circular recess, the proportions of the recess and master bushing being such that, in the absence of the drive bushing, a slip may be moved from the upper surface of the table across the non-circular recess and into position within the tapered bore without meeting the upstanding wall as an obstruction.

6. In combination, a Kelly drive bushing adapted to be driven by a rotary member, the rotary member including a master bushing having a central tapered bore through which the kelly may extend, the tapered bore terminating in a circular opening, cooperating drive elements on the rotary member and the drive bushing engageable through relative axial movement, the drive bushing when inoperative being adapted to be supported by the kelly, a depending extension on the drive bushing adapted to project into the tapered bore when the kelly is lowered through the circular opening, the extension having a cylindrical portion at its lower end adapted to slide down the taper bore and form a relatively close running fit within the circular opening and thereby automatically align the kelly and drive bushing coaxially of the rotary member prior to engagement of the cooperating drive elements.

7. In combination, a Kelly drive bushing adapted to be driven by a rotary member, the rotary member including a master bushing having a central tapered bore through which the kelly may extend, the tapered bore terminating in a circular opening, cooperating drive elements on the rotary member and the drive bushing engageable through relative axial movement, the drive bushing when inoperative being adapted to be supported by the kelly, a depending extension on the drive bushing adapted to project into the tapered bore when the kelly is lowered through the circular opening, the extension having an enlarged cylindrical portion at its lower end adapted to slide down the taper bore and form a sliding fit within the circular opening and thereby align the drive bushing coaxially of the rotary member prior to engagement of the cooperating drive elements, the enlarged cylindrical portion being adapted to move out of cooperative relationship with the circular opening and form clearance therewith upon completion of engagement of said cooperating drive elements.

8. In a rotary table structure including a master bushing for arrangement in the table and having a central opening, an opening in the table structure offset from the central opening, a drive bushing to be removably carried by the master bushing, a part projecting from the lower end of the drive bushing adapted to enter the offset opening for the transmission of rotation and to allow the lower end of the drive bushing to rest on the upper end of the table structure, the lower end of said part being engageable with the upper end of the table structure when said part is out of alignment with the offset opening, and a pilot element extending from the lower end of the drive bushing to enter said central opening and centralize the drive bushing so that said part is readily entered in said offset opening and turntable in said central opening so that relative turning between the drive bushing and table structure will cause said part to enter the offset opening.

9. A Kelly bushing for use with a rotary table assembly having a central opening and openings spaced about and spaced from the central opening comprising a bushing body, spaced parts projecting from the lower end of the body adapted to be entered in the second named openings for the transmission of rotation from the table assembly to the body, and a pilot element on the lower end of the body projecting downwardly beyond said parts adapted to turnably engage in the central opening to centralize the body relative to the table assembly so that said parts may be readily entered in said second named openings by relative turning between the bushing and table assembly.

10. A Kelly bushing for driving a kelly and adapted for use with a rotary table assembly having a central opening and an offset opening, the Kelly bushing comprising a body to engage around the kelly and adapted to rest on the upper end of the table assembly, a part projecting from the lower end of the body to engage in the offset opening for the transmission of rotation from the table assembly to the body when the body is resting on the upper end of the table assembly, means carried by the body for transmitting rotation to the kelly, and a split sleeve assembled around the kelly and carried by the body to project from its lower end, the sleeve being turnably engageable in the central opening so that said part may be readily entered in said offset opening by relative turning between the body and table assembly.

FORREST J. YOUNG.

REFERENCES CITED

The following references are of record in the file of this patent:

UNITED STATES PATENTS

| Number | Name | Date |
| --- | --- | --- |
| 1,331,309 | Wright | Feb. 17, 1920 |
| 1,496,046 | Young | June 3, 1924 |
| 1,518,325 | Hild | Dec. 9, 1924 |
| 1,347,771 | Wright | July 27, 1920 |
| 1,782,769 | Spalding | Nov. 25, 1930 |
| 1,656,456 | Trout | Jan. 17, 1928 |
| 1,758,426 | Black | May 13, 1930 |
| 1,795,693 | Wilson | Mar. 10, 1931 |
| 1,259,852 | Greve | Mar. 19, 1918 |
| 2,030,318 | Pranger | Feb. 11, 1936 |
| 1,449,647 | Boykin | Mar. 27, 1923 |
| 1,771,391 | Black | July 29, 1930 |
| 2,182,938 | Black et al. | Dec. 12, 1939 |